US012729497B2

(12) United States Patent
Creech, Jr.

(10) Patent No.: US 12,729,497 B2
(45) Date of Patent: Sep. 8, 2026

(54) RESTORATION UNITS AND METHOD

(71) Applicant: The Davey Tree Expert Company, Kent, OH (US)

(72) Inventor: Frederick Worth Creech, Jr., Raleigh, NC (US)

(73) Assignee: The Davey Tree Expert Company, Kent, OH (US)

( * ) Notice: Subject to any disclaimer, the term of this patent is extended or adjusted under 35 U.S.C. 154(b) by 57 days.

(21) Appl. No.: 18/913,011

(22) Filed: Oct. 11, 2024

(65) Prior Publication Data

US 2025/0122684 A1 Apr. 17, 2025

Related U.S. Application Data

(60) Provisional application No. 63/590,183, filed on Oct. 13, 2023.

(51) Int. Cl.

*E02B 3/12* (2006.01)
*E02B 3/04* (2006.01)
*E02B 3/08* (2006.01)
*A01K 61/54* (2017.01)

(52) U.S. Cl.

CPC .............. *E02B 3/129* (2013.01); *E02B 3/046* (2013.01); *E02B 3/08* (2013.01); *A01K 61/54* (2017.01)

(58) Field of Classification Search

CPC ... E02B 3/046; E02B 3/08; E02B 3/12; E02B 3/129; E02B 3/14; A01K 61/54

See application file for complete search history.

(56) References Cited

U.S. PATENT DOCUMENTS

| | | | | |
|---|---|---|---|---|
| 6,830,411 | B1 * | 12/2004 | Amari ....................... | E02B 3/04 405/32 |
| 2023/0304244 | A1 * | 9/2023 | Creech, Jr. ................ | E02B 3/04 |

OTHER PUBLICATIONS

"Why use Recycled Concrete/Crushed Concrete"; Superior Groundcover Incorporated https://www.superiorgroundcover.com/why-use-crushed-concrete/ (Year: 2019).*

* cited by examiner

*Primary Examiner* — Kyle Armstrong
(74) *Attorney, Agent, or Firm* — TUCKER ELLIS LLP

(57) ABSTRACT

A plurality of structural units for construction of eco-friendly structures in a body of water. A plurality of structural units comprises a primarily calcium carbonate material, preferably obtained from once living material from an organism, and a cement that is capable of holding the primarily calcium carbonate material. The plurality of structural units are of variable size and shape and are obtained by breaking up a larger portion of a composition formed by combining the primarily calcium carbonate material and the cement to hold the primarily calcium carbonate material.

22 Claims, 9 Drawing Sheets

RESTORATION UNITS AND METHOD

CROSS REFERENCE TO RELATED APPLICATIONS

The present application is related to, and claims priority from, U.S. Provisional Application Ser. No. 63/590,183, filed Oct. 13, 2023, the contents of which are hereby incorporated by reference in their entirety.

BACKGROUND

Field of Invention

The present invention relates to units that are designed to stabilize a shoreline, rip rap for coastal restoration, construct revetments, and provide a place for aquatic life to thrive.

Description of Related Art

For wild oyster propagation, the preferred material is recycled oyster shell. However, there is a shortage of recycled oyster shell. It comes from non-profit, municipal, or private recycling programs, which typically cannot meet the demand for recycled oyster shell. An alternative to recycled oyster shell is quarried rock, such as limestone, marl, or granite. The rock is laid on water bottoms where wild oysters thrive historically. These can be in designated sanctuaries, or actively harvested nurseries. Additionally recycled concrete is used, but the recycled concrete is often contaminated. There has been pushback from government agencies and non-government organizations (NGO) in using the contaminated recycled concrete.

Currently, granite and marl are the materials most used in restoration applications and oyster propagation. Granite is denser than marl and is preferred; however, granite has to be quarried in non-coastal areas, such as Piedmont areas, and hauled to the coast. Thus, granite is a less economical choice. Alternatively, marl is better at attracting oysters and other aquatic life. However, marl is lighter, more porous, and thus has a tendency to “float” away, or disperse along the water bottom with slight currents.

SUMMARY

One object of the present invention is to provide an economical solution to construct revetments, artificial reefs, shore stabilization, and other semi-aquatic ecological restoration constructions.

A further object of the present invention is to provide a composition for the restoration units, the composition preferably using locally source materials and some natural materials.

Another object of the present invention is to provide a method for making the restoration units of various sizes according to their construction requirements.

An additional object of the present invention is to provide a material that has the advantages of oyster shell and marl with the density of quarried rock like granite and non-calcium carbonate concrete.

A further object of the present invention to provide a customizable material using various blends of oyster shell, marl, and calcium carbonate concrete to meet the specific requirements and needs in different habitats and use cases.

These and other objects and advantages of the invention, either alone or in combinations thereof, may be satisfied by a plurality of structural units for construction of eco-friendly structures in a body of water comprising:

a) a primarily calcium carbonate material; and b) a cement that is capable of holding the primarily calcium carbonate material; wherein the plurality of structural units are of variable size and shape and are obtained by breaking up a larger portion of a composition formed by combining the primarily calcium carbonate material and the cement to hold the primarily calcium carbonate material.

The foregoing and other features of the application are described below with reference to the drawings.

DETAILED DESCRIPTION

Figure 1:
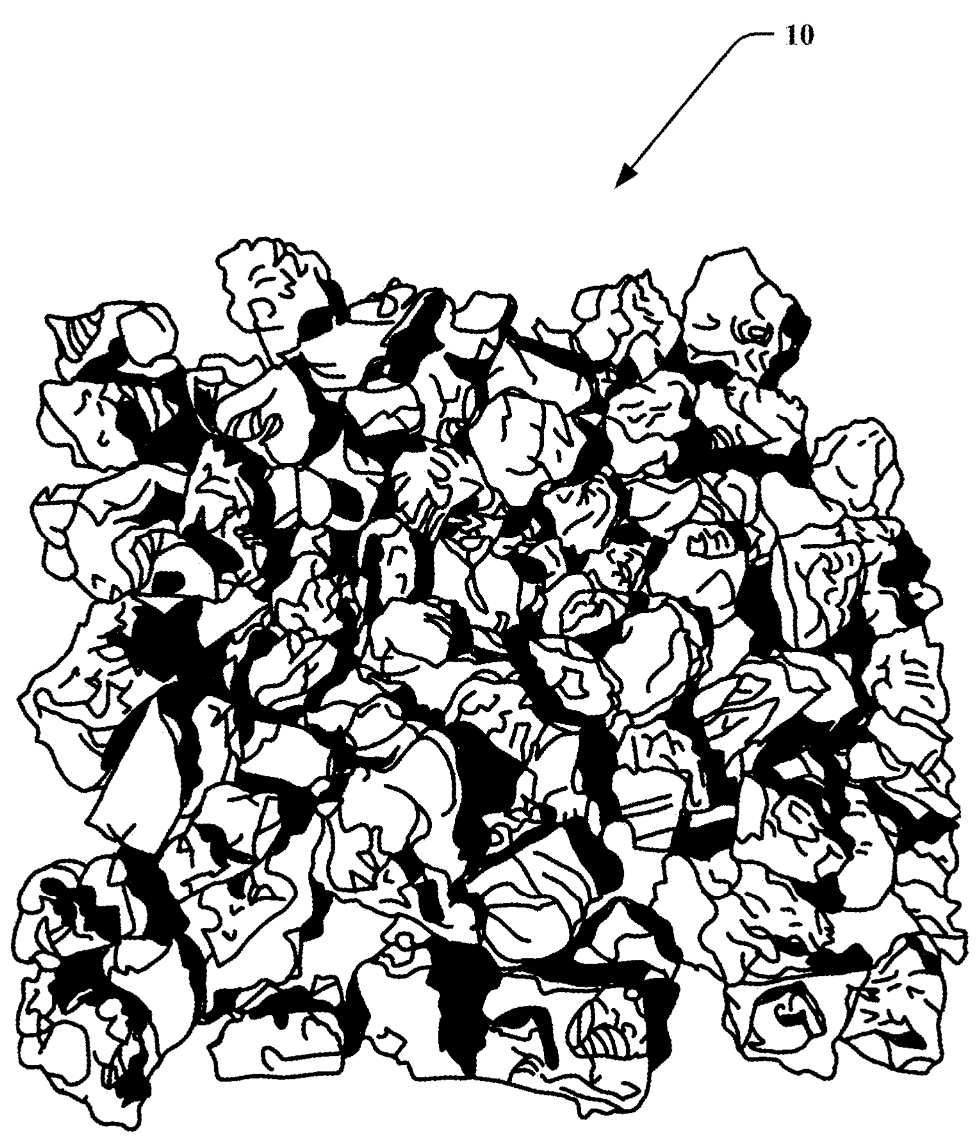
FIG. 1 shows an embodiment depicting a plurality of restoration units.

The terms “about” and “essentially” mean±10 percent.

The terms “a” or “an,” as used herein, are defined as one or as more than one. The term “plurality,” as used herein, is defined as two or as more than two. The term “another,” as used herein, is defined as at least a second or more. The terms “including” and/or “having,” as used herein, are defined as comprising (i.e., open language). The term “coupled,” as used herein, is defined as connected, although not necessarily directly, and not necessarily mechanically.

The term “comprising” is not intended to limit inventions to only claiming the present invention with such comprising language. Any invention using the term comprising could be separated into one or more claims using “consisting” or “consisting of” claim language and is so intended.

Reference throughout this document to “one embodiment”, “certain embodiments”, “an embodiment”, or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

The restoration units 10 may be made of virgin materials. The restoration units may be sized to any specification, and the ratios of the composite materials may be adjusted to achieve a desired look or consistency. The restoration units may be primarily made of calcium carbonate; i.e. marl sand, marl aggregate, oyster shell, and cement. The restoration units may be denser than marl riprap of the same size. The restoration units may be lighter than granite, but may attract and grow oysters much better. Furthermore, the material that makes up the restoration units may be local and native to coastal regions, thus making availability and production more efficient. This and other factors result in a better carbon footprint when constructing structures with the restoration units.

As used herein, the term "restoration unit" 10 refers to a solid piece of a plurality of primarily calcium carbonate material held together with cement and in one embodiment, with a bio-cement. FIG. 1 shows one embodiment, in which the plurality of restoration units 10 has an irregular shape, though any shape is contemplated. While the restoration units 10 can be any size, the smallest practical restoration unit 10 will range from 3 inches to 24 inches, and weigh 0.5 pounds to 300 pounds.

As used herein, the term "primarily calcium carbonate material" refers to rocks, clays, minerals, and, in certain embodiments, once living material from a living organism that produces portions of the organism that are primarily made up of calcium carbonate. Examples are limestone, marble, chalk, marl sand, marl aggregate, bird eggshells, and aquatic products. Included in aquatic products and aquatic shells are oysters, seashells, snail shells, pearls, coral, tufa, and the like. A collection of these materials is treated with cement in a slab form to produce a slab of the material, once the cement dries.

As used herein, the term "cement" refers to any biocompatible material, which can be used to hold the primarily calcium carbonate material together in a slab form and be resistant to wave action, storms, and the like. An example includes, but is not limited to, portland cement. In one embodiment, the cement is a bio-cement compatible with the primarily calcium carbonate material, which has the capability of supporting growth on the slab formation by the primarily calcium carbonate material and cement. An example includes quicklime made from oyster shells.

As used herein, the term "slab" refers to a solid piece of primarily calcium carbonate material held together with cement and in one embodiment, with a bio-cement. In one embodiment, the slab has a generally rectangular shape, though any shape is contemplated. While the slab can be any size, the thickness may range from 3 inches to 24 inches.

Figure 2:
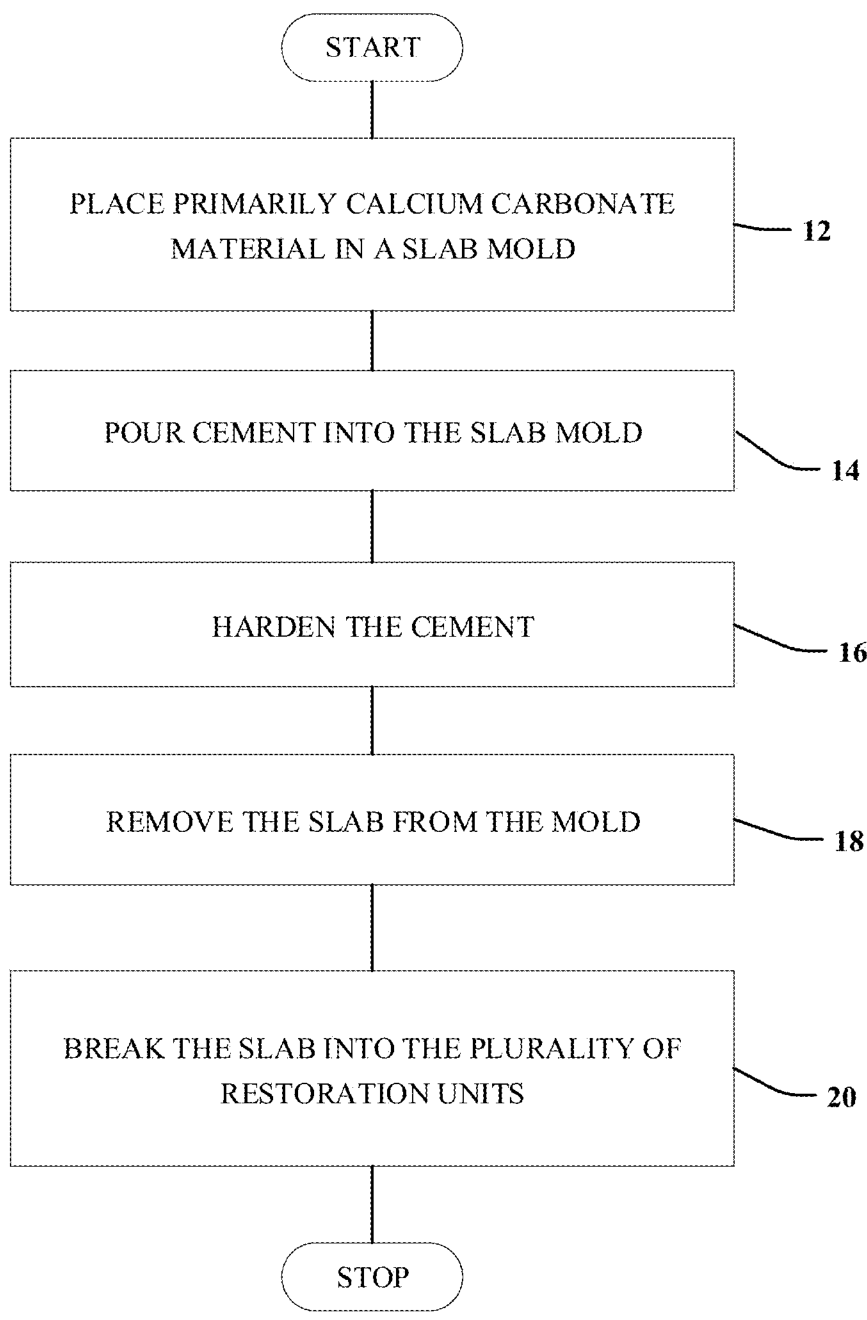
FIG. 2 is a flowchart depicts a method of making a plurality of restoration units.
Figure 3:
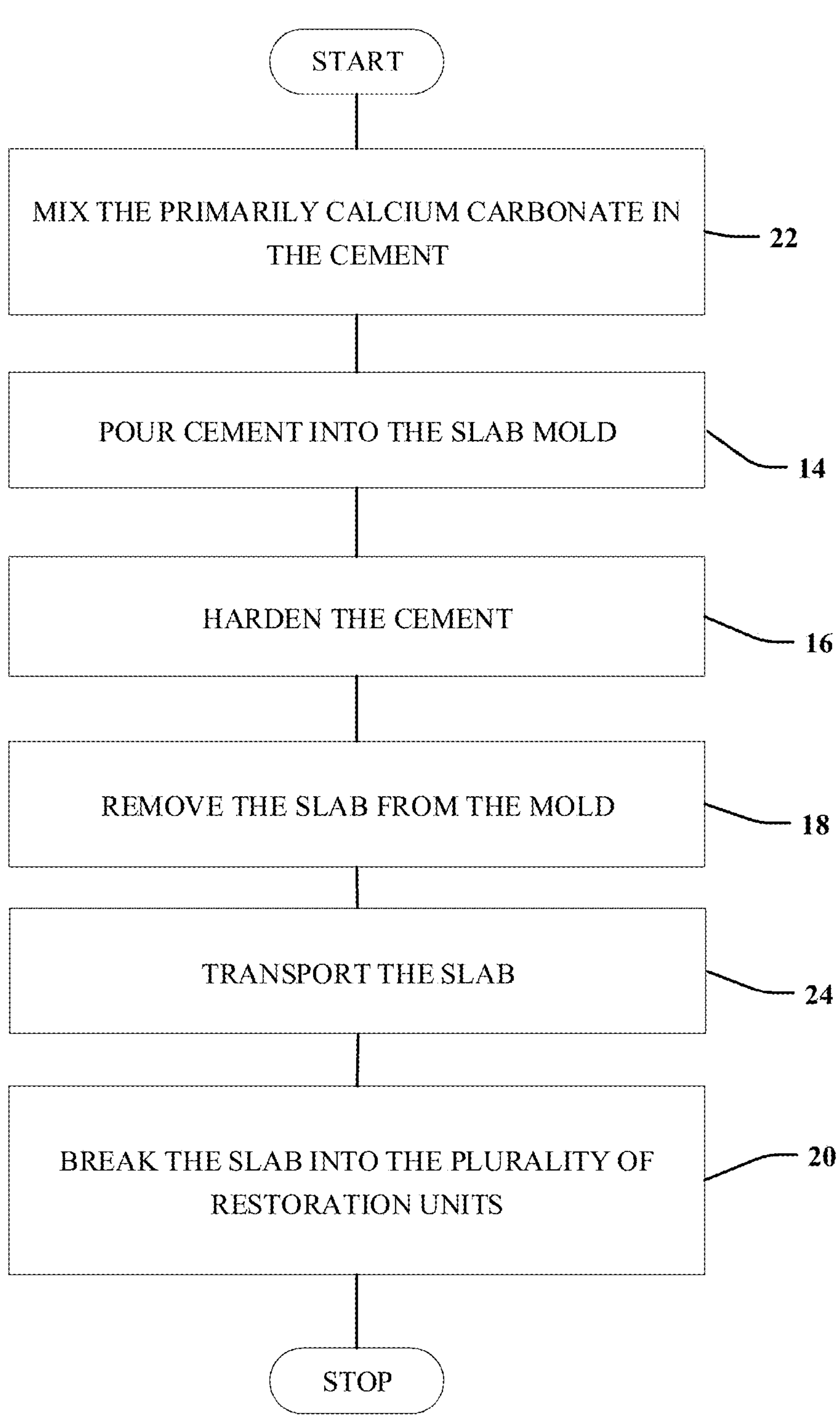
FIG. 3 is a flowchart depicts another method of making a plurality of restoration units.

FIGS. 2 and 3 show exemplary methods of making a slab and the resulting restoration units, though it may be appreciated by those skilled in the art alternative methods. A plurality of primarily calcium carbonate material, such as oyster shells is placed in a mold structure 12. Next, a cement or a bio-cement is poured into the mold 14. In an alternative embodiment, marl sand or marl aggregates may be mixed in the cement 22 and poured in the mold structure without oyster shells 14. When the slab hardens 16, the slab can be removed from the mold structure after the cement cures 18 and the slab transported 24. In an alternative embodiment, after the slab hardens, the slab may be broken up into irregular shaped restoration units 20. These irregular shaped restoration units with the oyster shells may have rougher jagged edges, while the restoration units without oyster shells may be smoother.

Figure 4:
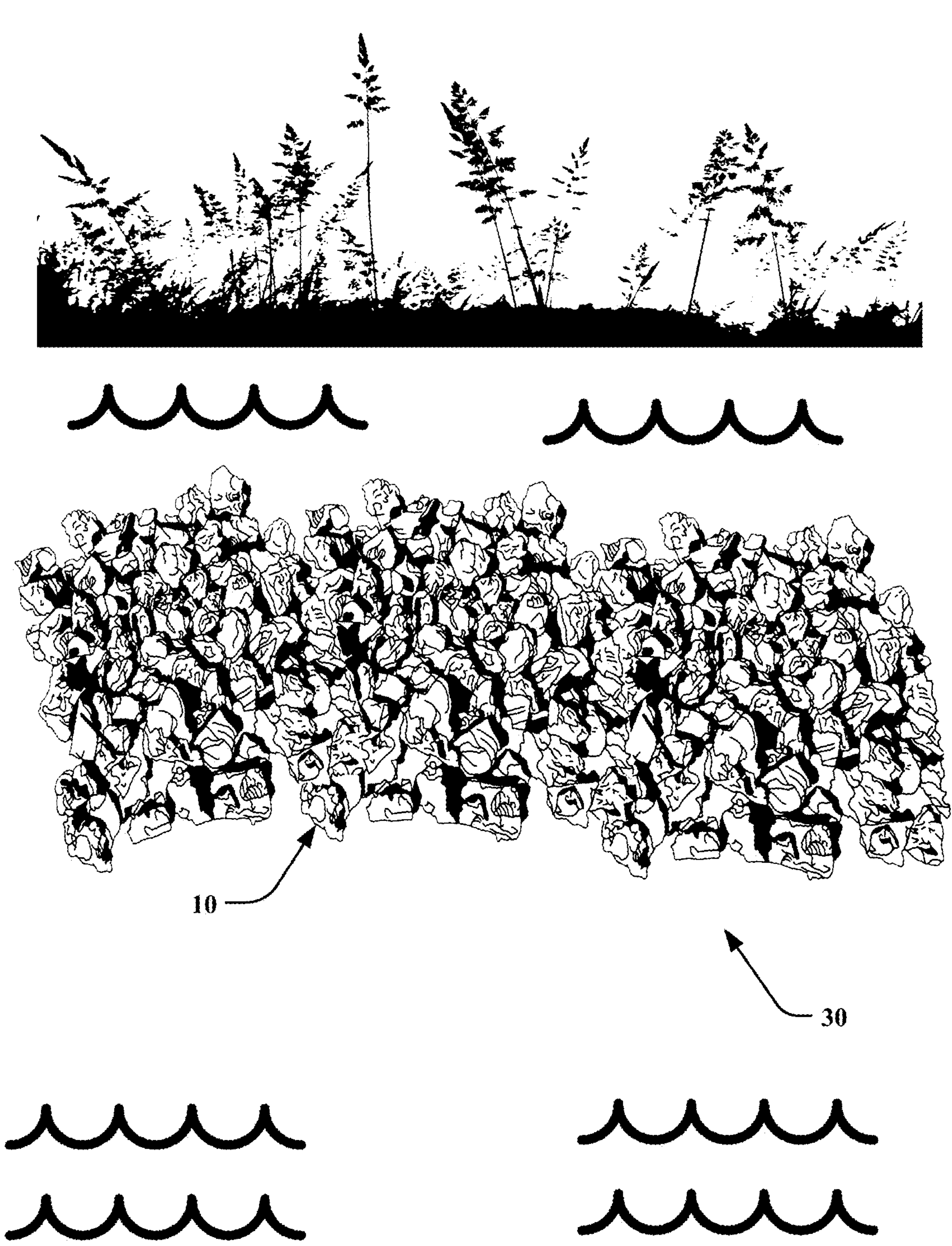
FIG. 4 shows an aerial view of an embodiment depicting a plurality of restoration units as applied to shoreline stabilization.
Figure 5:
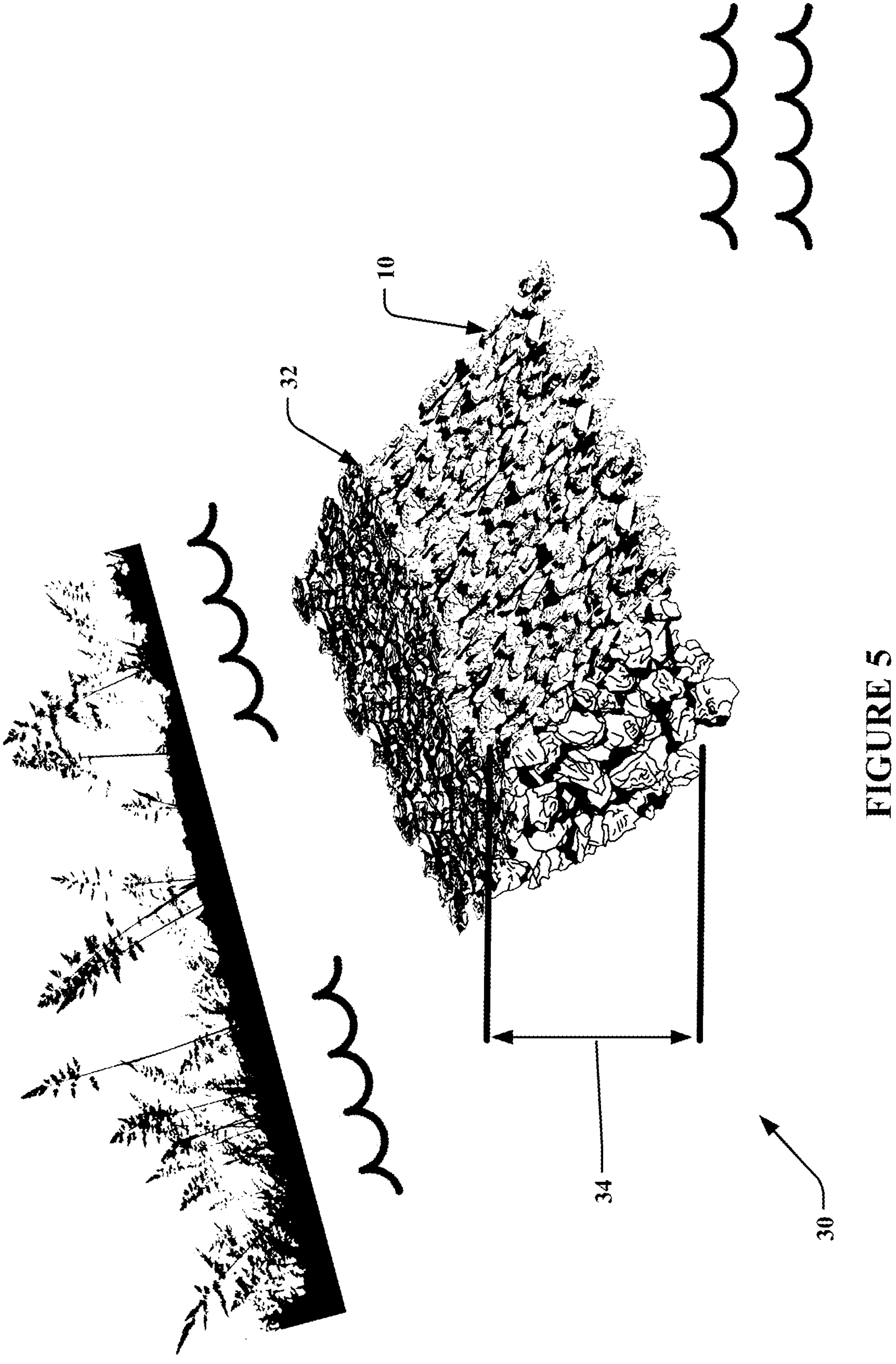
FIG. 5 shows a perspective view of the embodiment depicting a plurality of restoration units as applied to shoreline stabilization.

FIGS. 4 and 5 show an aerial view and perspective view of an embodiment of the present invention. In this view, the restoration units may be applied for shoreline stabilization 30. Shoreline stabilization 30 may combat the erosion of coastal shorelines and may preferably support aquatic life. The restoration units 10 may be placed in the designated area. The restoration units 10 may be spread in a single layer of about 3 inches thick over acres of water bottom for oyster nurseries. The layer of restoration units 10 on the water bottom may encourage wild cultch propagation that may be harvested using known techniques. The layer of restoration units 10 on the water bottom may house oyster sanctuaries. The oyster sanctuary area may prohibit commercial oyster harvesting. The oyster sanctuary areas may be a mound 32 or sill of restoration units 10. In other embodiments, the restorations units 10 may be formed into a mound 32 or sill, or in any desired shape, such as in the shape of a rectangular prism arranged in a long row. The mound 32 of the shore stabilization 30 may have a height 34. The mound of the shore stabilization may be formed into any desired height, preferably from a minimum height of 3 inches to a maximum height of 8 feet, depending on a variety of factors, including, but not limited to, depth of water, distance from shore, water currents, etc. The selection of the desired height is well within the abilities of one of ordinary skill in this field. The variation in size and shape of the restoration units 10 may interlock with one another enhancing the stability and cohesion of the structure. The mound 32 may be formed by hand, placing the restoration units 10 over each other. The mound 32 may be formed by hauling the restoration units 10 to the designated area by a vehicle like a car, truck, articulated hauler, or the like. The restoration units 10 may be placed in the designated area by any desired method, including but not limited to, by hand, by funneling through a chute over the designated area, lifting by a crane to place in the designated area, particularly for heavier installations, or pushing or dumping into place by a backhoe loader, over the side of a floating barge or other vessel, or the like.

Figure 6:
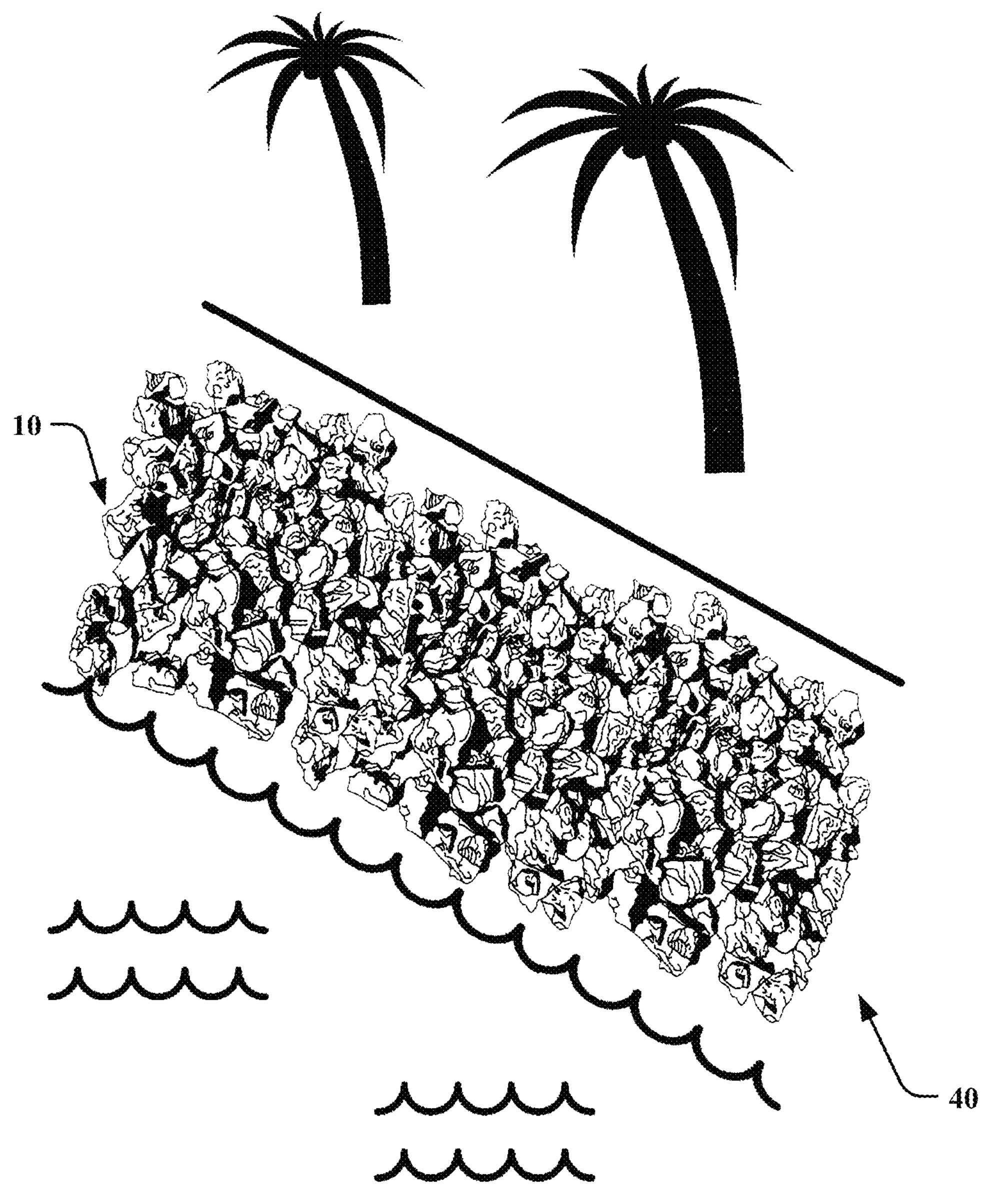
FIG. 6 shows an aerial view of an embodiment depicting a plurality of restoration units as applied to a revetment.
Figure 7:
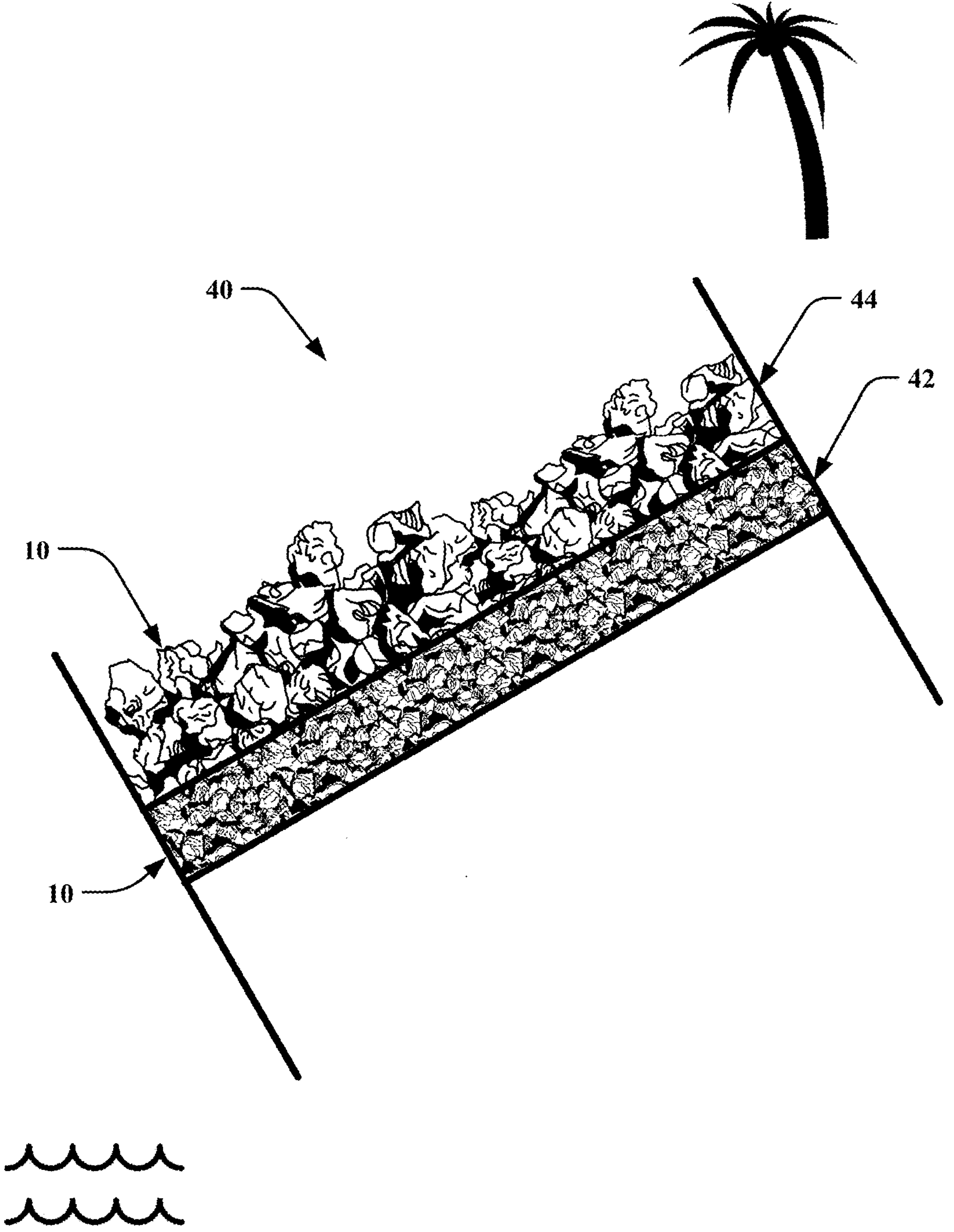
FIG. 7 shows a cross-section view of the embodiment depicting a plurality of restoration units as applied to a revetment.

FIGS. 6 and 7 show an aerial view and cross-section view of an embodiment of the present invention. In this view, the restoration units 10 may be applied to construct a revetment 40. A revetment 40 is aimed at safeguarding coastal or riverbank areas from the erosive forces of waves, currents, and water flow. The designated area of the revetment 40 is excavated and leveled, removing any vegetation or organic matter that may undermine the structure's stability. A sound foundation provides the necessary support for the revetment 40. In order to augment the revetment's stability and effectiveness, an underlayer 42 is often introduced at its base. The underlayer 42 may comprise varying sizes of restoration units 10, alone or in addition to smaller stones or riprap. The underlayer 42 disperses wave energy, thereby reducing the risk of erosion at the foundation. The core 44 of the revetment 40 is constructed by placing the restoration units 10 systematically in a structure capable of absorbing and deflecting the energy of incoming waves while halting further erosion. The variation in size and shape of the restoration units 10 may interlock with one another enhancing the stability and cohesion of the structure. The revetment 40 may be formed by hauling the restoration units 10 to the designated area by a vehicle like a car, truck, articulated hauler, or the like. The restoration units 10 may be placed by any of the various methods noted above.

Figure 8:
FIG. 8 shows a perspective side view of an embodiment depicting a plurality of restoration units as applied to an artificial reef.
Figure 8:
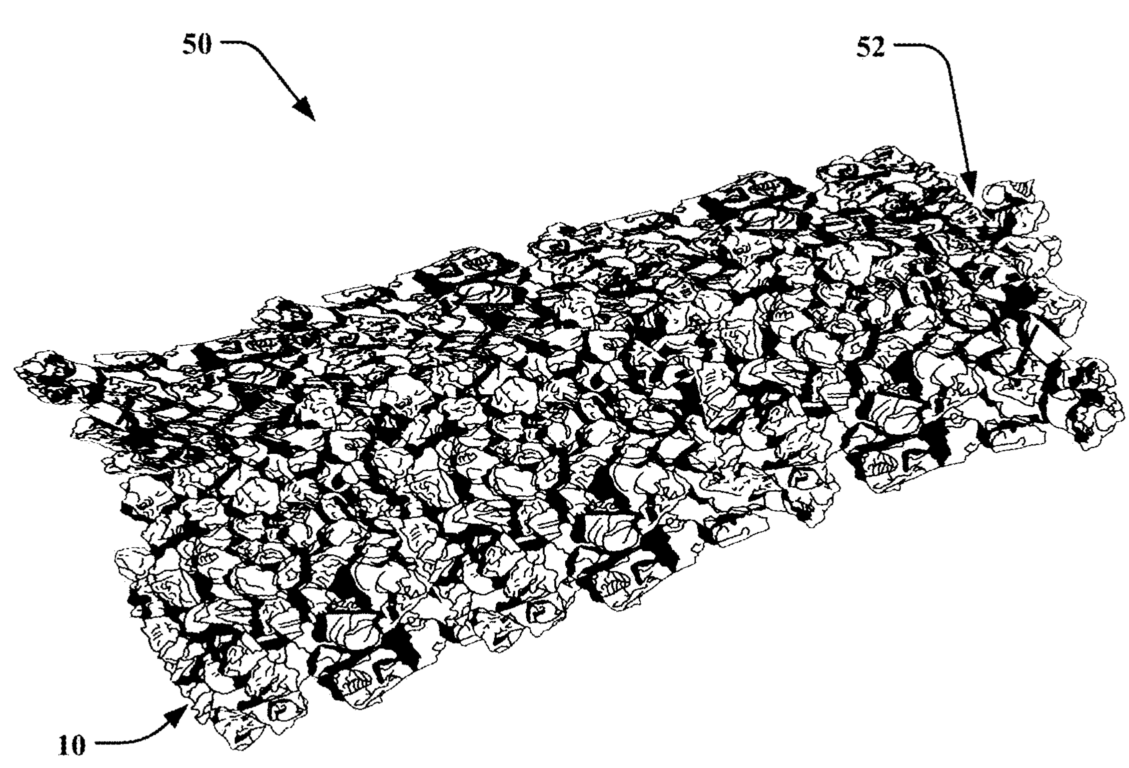
Figure 9:
FIG. 9 shows a perspective end view of the embodiment depicting a plurality of restoration units as applied to an artificial reef.
Figure 9:
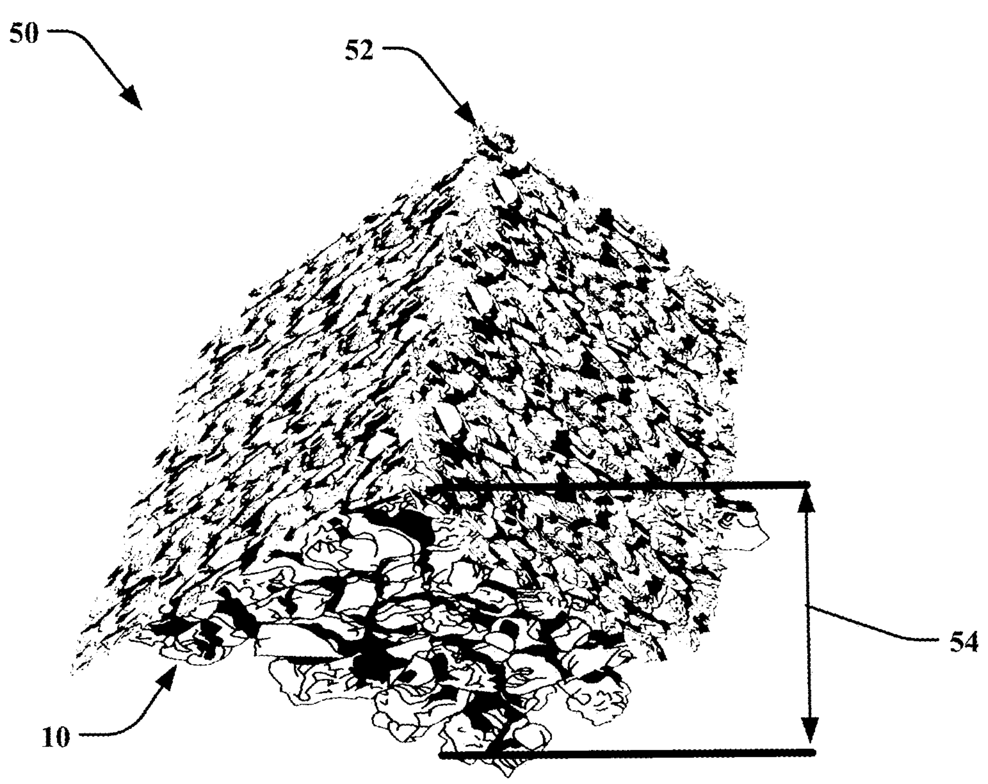

FIGS. 8 and 9 show a perspective side view and a perspective end view of another embodiment of the present invention. In this view, the restoration units 10 may be applied to construct an artificial reef 50. The artificial reef 50 may be constructed to enhance marine habitats or combat erosion. The restorations units 10 may generally be formed into a mound 52, or in any desired shape, such as in the shape of a rectangular prism arranged in a long row. The mound 52 of the artificial reef 50 may have a height 54. The mound 52 for the artificial reef 50 may be formed into any desired height, preferably up to a maximum height of 10 feet, again depending on water depth, location relative to shore, water currents, etc.

The selection of the desired height is well within the abilities of one of ordinary skill in this field. The variation in size and shape of the restoration units 10 may interlock with one another enhancing the stability and cohesion of the structure. The restoration units 10 may be transported to the designated location in the water by water-vehicle, a boat, barge, pontoon, or the like, or carried my hand. The restoration units 10 may be placed by any of the various methods noted above.

The following is a non-exhaustive listing of various embodiments of the present invention:

Embodiment 1. A plurality of structural units for construction of eco-friendly structures in a body of water comprising:

a) a primarily calcium carbonate material; and b) a cement that is capable of holding the primarily calcium carbonate material;

wherein the plurality of structural units are of variable size and shape and are obtained by breaking up a larger portion of a composition formed by combining the primarily calcium carbonate material and the cement to hold the primarily calcium carbonate material.

Embodiment 2. The plurality of structural units according to Embodiment 1, wherein the primarily calcium carbonate material is obtained from once living material from an organism.

Embodiment 3. The plurality of structural units according to Embodiment 1 or Embodiment 2, wherein the primarily calcium carbonate material comprises aquatic shells.

Embodiment 4. The plurality of structural units according to any one of Embodiments 1 to 3, wherein the cement is a bio-cement.

Embodiment 5. The plurality of structural units according to any one of Embodiments 1 to 4, wherein the larger portion of the composition is a slab and the slab is broken into the plurality of structural units having variable size and shape.

Embodiment 6. The plurality of structural units according to Embodiment 5, wherein the slab has a thickness ranging from 3 inches to 24 inches.

Embodiment 7. The plurality of structural units according to any one of Embodiments 1 to 5, wherein the plurality of structural units each have a maximum dimension of length or width ranging from 3 inches to 24 inches.

Embodiment 8. The plurality of structural units according to any one of Embodiments 1 to 7, wherein the plurality of structural units each have a weight in a range from 0.5 pounds to 300 pounds.

Embodiment 9. The plurality of structural units according to Embodiment 6, wherein the plurality of structural units each have a maximum dimension of length or width ranging from 3 inches to 24 inches.

Embodiment 10. The plurality of structural units according to Embodiment 9, wherein the plurality of structural units each have a weight in a range from 0.5 pounds to 300 pounds.

Embodiment 11. A method of making the plurality of structural units according to any one of Embodiments 1 to 10 comprising:

a) providing a plurality of primarily calcium carbonate material;

b) placing the primarily calcium carbonate material in a slab mold structure;

c) pouring the cement into the slab mold in a sufficient amount that when the cement hardens the slab can be removed from the mold; and d) breaking the slab into the plurality of structural units of variable shape and size.

Embodiment 12. The method according to Embodiment 11, wherein the primarily calcium carbonate material is obtained from once living material from an organism.

Embodiment 13. The method according to Embodiment 11 or Embodiment 12, wherein the primarily calcium carbonate material is aquatic shells.

Embodiment 14. The method according to any one of Embodiments 11 to 13, wherein the cement is a bio-cement.

Embodiment 15. The method according to any one of Embodiments 11 to 14, wherein the slab has a thickness ranging from 3 inches to 24 inches.

Embodiment 16. The method according to any one of Embodiments 11 to 14, wherein the plurality of structural units each have a maximum dimension of length or width ranging from 3 inches to 24 inches.

Embodiment 17. The method according to any one of Embodiments 11 to 14, wherein the plurality of structural units each have a weight in a range from 0.5 pounds to 300 pounds.

Embodiment 18. The method according to Embodiment 15, wherein the plurality of structural units each have a maximum dimension of length or width ranging from 3 inches to 24 inches.

Embodiment 19. The method according to Embodiment 18, wherein the plurality of structural units each have a weight in a range from 0.5 pounds to 300 pounds.

Embodiment 20. A shoreline stabilization structure formed from the plurality of structural units according to any one of Embodiments 1 to 10.

Embodiment 21. An artificial reef structure formed from the plurality of structural units according to any one of Embodiments 1 to 10.

Embodiment 22. A revetment structure formed from the plurality of structural units according to any one of Embodiments 1 to 10.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A plurality of structural units for construction of eco-friendly structures in a body of water comprising:

a) a primarily calcium carbonate material; and b) a cement that is capable of holding the primarily calcium carbonate material;

wherein the plurality of structural units are of variable size and shape and are obtained by breaking up a larger portion of a composition formed by combining the primarily calcium carbonate material and the cement to hold the primarily calcium carbonate material.

2. The plurality of structural units according to claim 1, wherein the primarily calcium carbonate material is obtained from once living material from an organism.

3. The plurality of structural units according to claim 1, wherein the primarily calcium carbonate material comprises aquatic shells.

4. The plurality of structural units according to claim 1, wherein the cement is a bio-cement.

5. The plurality of structural units according to claim 1, wherein the larger portion of the composition is a slab and the slab is broken into the plurality of structural units having variable size and shape.

6. The plurality of structural units according to claim 5, wherein the slab has a thickness ranging from 3 inches to 24 inches.

7. The plurality of structural units according to claim 1, wherein the plurality of structural units each have a maximum dimension of length or width ranging from 3 inches to 24 inches.

8. The plurality of structural units according to claim 1, wherein the plurality of structural units each have a weight in a range from 0.5 pounds to 300 pounds.

9. The plurality of structural units according to claim 6, wherein the plurality of structural units each have a maximum dimension of length or width ranging from 3 inches to 24 inches.

10. The plurality of structural units according to claim 9, wherein the plurality of structural units each have a weight in a range from 0.5 pounds to 300 pounds.

11. A method of making the plurality of structural units according to claim 1 comprising:

a) providing a plurality of primarily calcium carbonate material;

b) placing the primarily calcium carbonate material in a slab mold structure;

c) pouring the cement into the slab mold in a sufficient amount that when the cement hardens the slab can be removed from the mold; and d) breaking the slab into the plurality of structural units of variable shape and size.

12. The method according to claim 11, wherein the primarily calcium carbonate material is obtained from once living material from an organism.

13. The method according to claim 11, wherein the primarily calcium carbonate material is aquatic shells.

14. The method according to claim 11, wherein the cement is a bio-cement.

15. The method according to claim 11, wherein the slab has a thickness ranging from 3 inches to 24 inches.

16. The method according to claim 11, wherein the plurality of structural units each have a maximum dimension of length or width ranging from 3 inches to 24 inches.

17. The method according to claim 11, wherein the plurality of structural units each have a weight in a range from 0.5 pounds to 300 pounds.

18. The method according to claim 15, wherein the plurality of structural units each have a maximum dimension of length or width ranging from 3 inches to 24 inches.

19. The method according to claim 18, wherein the plurality of structural units each have a weight in a range from 0.5 pounds to 300 pounds.

20. A shoreline stabilization structure formed from the plurality of structural units according to claim 1.

21. An artificial reef structure formed from the plurality of structural units according to claim 1.

22. A revetment structure formed from the plurality of structural units according to claim 1.

* * * * *